United States Patent [19]  
Raisanen

[11] Patent Number: 4,794,980  
[45] Date of Patent: Jan. 3, 1989

[54] AIR TO AIR HEAT EXCHANGER
[75] Inventor: Niilo A. A. Raisanen, Cokato, Minn.
[73] Assignee: Raydot Incorporated, Cokato, Minn.
[21] Appl. No.: 121,129
[22] Filed: Nov. 16, 1987
[51] Int. Cl.⁴ ............................ F24H 3/02; F24F 7/10
[52] U.S. Cl. .................................... 165/54; 165/109.1;
165/154; 138/38
[58] Field of Search ...................... 165/54, 109.1, 177,
165/174, 901, 154; 138/38

[56] References Cited
U.S. PATENT DOCUMENTS

| 941,618 | 11/1909 | Churchill | 138/38 |
| 1,015,831 | 1/1912 | Pielock et al. | 138/38 |
| 1,059,600 | 4/1913 | Fisher . | |
| 1,319,621 | 10/1919 | Roughen | 165/901 |
| 1,349,482 | 8/1920 | Wood . | |
| 2,488,333 | 11/1949 | Schlachter | 165/54 |
| 3,082,821 | 3/1963 | Brown . | |
| 3,633,663 | 1/1972 | Tafel | 165/177 |
| 3,736,961 | 6/1973 | Walsh | 138/38 |
| 4,184,538 | 1/1980 | Rauenhorst . | |
| 4,590,990 | 5/1986 | George | 165/54 |
| 4,616,696 | 10/1986 | Brundrett et al. | 165/54 |

FOREIGN PATENT DOCUMENTS

| 0109731 | 6/1984 | Japan | 165/54 |
| 0115925 | 7/1984 | Japan | 165/54 |
| 2650 | of 1897 | United Kingdom | 165/177 |
| 86/06461 | 11/1986 | World Int. Prop. O. | 165/54 |

Primary Examiner—Albert W. Davis, Jr.  
Assistant Examiner—John K. Ford  
Attorney, Agent, or Firm—Palmatier & Sjoquist

[57] ABSTRACT

The present invention comprises an air to air heat exchanger having a circular outer housing and a circular exhaust duct lying there within a long the longitudinal central access thereof. A plurality of cone shaped turbulators are secured to a rod supported within and extending along the longitudinal central axis of the exhaust. The outer housing is made of a heat insulating plastic, and the exhaust duct, turbulators and central rod are made of corrosion resistant metals such as aluminum or stainless steel.

10 Claims, 3 Drawing Sheets

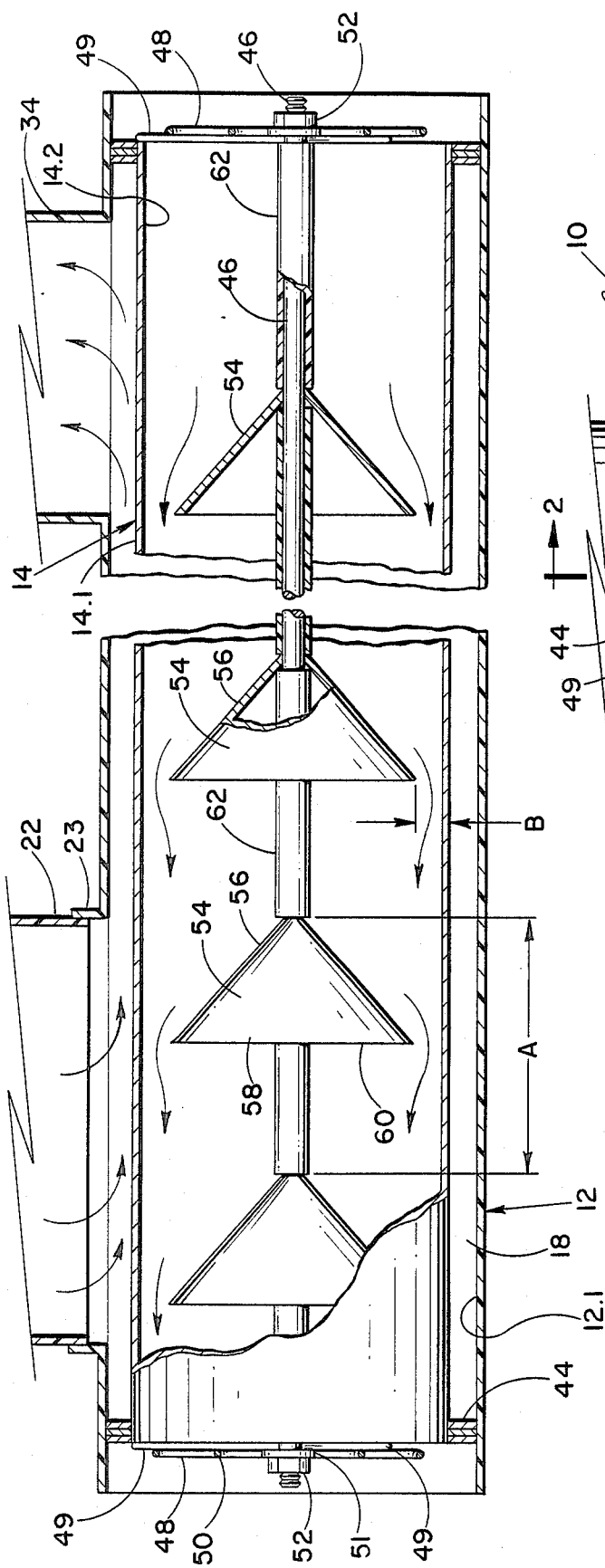
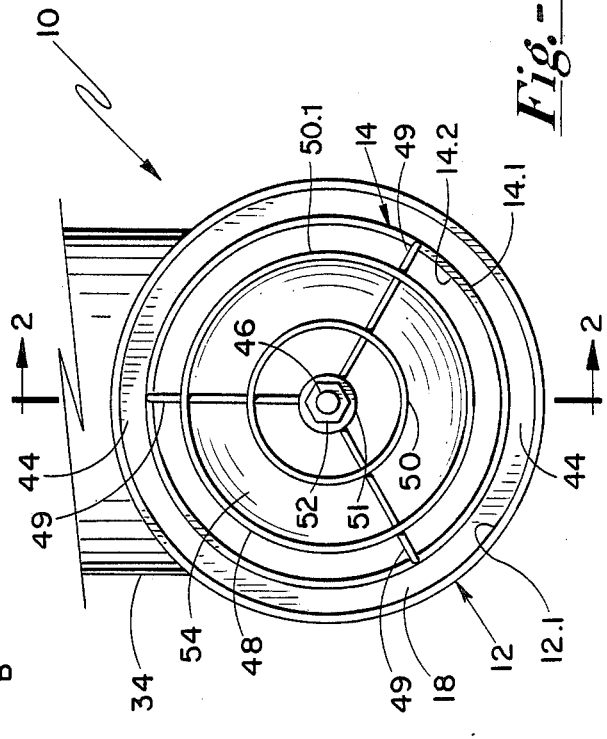

AIR TO AIR HEAT EXCHANGER

FIELD OF THE INVENTION

The present invention generally relates to air to air heat exchangers, and particularly to heat exchangers capable of operating in highly corrosive industrial applications and heat exchangers having improved thermal efficiency.

BACKGROUND OF THE INVENTION

Air to air heat exchange, as a general concept, has been known for many years. See for example, U.S. Pat. No. 1,059,600 to Fisher, and U.S. Pat. No. 1,349,482 to Wood and U.S. Pat. No. 3,082,821 to Brown. In recent years, due to the rapid increase in the cost of energy, the use of heat exchangers has gained renewed interest. In general, an air to air heat exchanger provides for the exhausting of undesirable or polluted air from the interior of a building by replacing the foul air with fresh air from the exterior of the buildings, and does so in a manner that conserves the desirable heat energy contained in the exhaust air. This is typically accomplished with the use of exhaust and fresh air ducts lying adjacent each other and having a common heat exchange surface therebetween. Thus, as the warm exhaust air flows through the exhaust air duct, the warm air transfers its heat through the heat exchange wall to the cooler intake air as it flows through the intake duct and contacts the common heat exchange wall. In this manner, a significant portion of the heat content of the exhaust air can be conserved. Therefore an important aspect of a heat exchanger is the thermal efficiency thereof, i.e. the extent to which it can recover the heat from the exhaust air, and thus, minimize energy loss.

An example of a more recent heat exchanger is seen in U.S. Pat. No. 4,184,538 to Rauenhorst. The Ruenhorst device shows the use of turbulator bars within the heat exhaust duct for imparting turbulence to the exhaust air. This mixing of the exhaust air results in greater heat transfer by causing a greater percentage of the exhaust air to contact, and thus, release heat to the heat transfer surface.

However, the overall design and structure of prior art air to air heat exchangers limits their range of application. In particular, heat exchangers are needed in industry that offer improved resistance to corrosive environments, and that are not significantly impaired by highly humid indoor environments. In addition, it would also be desirable in commercial and residential applications to have a heat exchanger that occupies a minimum of space, and offers improved heat transfer efficiency.

SUMMARY OF THE PRESENT INVENTION

An object of the present invention is to provide an air to air heat exchanger having improved heat transfer efficiency.

Another object of the present invention is to provide an air to air heat exchanger resistant to corrosive environments.

A further object of the present invention is to provide an air to air heat exchanger that occupies a minimum of space.

A further object of the present invention is to provide a heat exchanger whose operation is not significantly impaired by highly humid indoor environments.

The present invention features a tubular outer housing having a tubular heat transfer exhaust duct of a lesser diameter but of approximately equal length mounted there within and extending longitudinally along the central axis thereof. The exhaust duct provides for a flow of exhaust air through the interior thereof. An intake air passage is defined between the interior perimeter surface of the outer housing and the exterior perimeter surface of the exhaust duct for providing a flow of fresh air therethrough.

The present invention also features as series of turbulator cones. The cones are secured to a rod mounted within and extending longitudinally along the central axis of the exhaust duct. The cones are regularly spaced along the rod and the apical or pointed ends thereof face in a direction opposite to the flow of air through the exhaust duct. The perimeter of the base of the cones lies adjacent the interior perimeter of the exhaust duct.

In the preferred form of the present invention, the exterior housing is made of a corrosion resistant and insulating material, such as PVC tubing. The turbulator cones and exhaust duct are made of aluminum, or in highly corrosive environments, stainless steel.

The heat exchanger is mounted within the building or structure to be ventilated wherein one end thereof lies adjacent the exterior wall of the building for providing exhausting of the fouled air and intake of fresh air. The other end thereof is then located within the building to provide for removal of the exhaust air and supply of fresh air. Specifically, separate exterior exhaust and intake ducts are provided that terminate exterior of the building and are in exclusive air communication with the intake passage and the exhaust duct respectively. Also, separate interior intake and exhaust ducts are provided interior of the building and in exclusive air communication with the intake passage and exhaust duct respectively. The interior intake and exhaust ducts are secured to the end of the exterior housing and exhaust duct respectively opposite the exterior ends thereof and can further include a plurality of subsidiary ducts for providing uptake of the exhaust air and delivery of the fresh air to various locations of the structure.

The present invention also includes an exhaust fan connected to and in exclusive air communication with the exhaust duct at the interior end thereof for providing exhaust air flow therethrough. An intake fan is connected to and in exclusive air communication with the intake passage at the end thereof adjacent the exterior intake duct for providing the flow of fresh air through the intake air passage.

Thus, simultaneous operation of the exhaust and intake fans causes the intake and exhaust air to flow through the intake passage and exhaust duct, respectively, wherein a portion of the heat contained in the exhaust air can be transferred to the heat exchange surface represented by the perimeter surface of the exhaust duct.

The use of both exhaust and intake fans tends to balance the air pressure within the building to the air pressure at the exterior of the building, as to minimize leakage of air into or out of the building. As a result the heat is ultimately absorbed by the cooler intake air from the heat exchange surface as it flows through the intake passage.

The turbulator cones provide for mixing of the exhaust air as it flows through the exhaust duct so as to increase the percentage of that air that comes in contact with the heat exchange surface, thereby providing for better extraction of heat from the exhaust air. In particular, the exhaust air will flow along the smooth regular exterior surface of the cones and be deflected thereby towards the heat exchange surface of the exhaust duct. Furthermore, as the perimeter of the base of the cone is adjacent the interior perimeter of the heat exchange surface the flow of exhaust air is restricted at that point. As a result, there exists a somewhat higher air pressure just prior to that point of restricted air flow relative to the air pressure just after the point of restriction. Thus, the exhaust air is accelerated slightly as it flows past the base of each cone into the lower pressure area between the apical end of the subsequent cone and the base end of the previous cone. This acceleration into the filling of the low pressure area creates a mixing of the air and also helps to move the air towards the next cone.

The overall operating efficiency of the device herein was found experimentally to depend, at least in part, upon a relationship between the width of the areas of restriction, i.e. the distance between the perimeter of the base of a cone and the interior perimeter of the heat exchange duct, and the spacing of the cones along the central rod. In the preferred form of the present invention, maximum thermal efficiency is achieved when the apical ends of the cones are separated by a distance equalling approximately ten (10) times the distance between the perimeter of the base of a cone and the interior surface of the exhaust duct.

When mounted in the particular structure the present invention is disposed at a slight angle wherein the end thereof adjacent the exterior of the building is slightly lower than the opposite end thereof interior of the building. Also, the end of the exhaust duct adjacent the exterior the structure includes a drain means in fluid communication therewith. Thus, in situations where the exhaust air is partiularly humid it has been found that as the exhaust air cools the water therein condenses and forms within the exhaust duct. Therefore, due to the slight angular positioning of the present invention any such water will flow toward the drain means and be removed from the exhaust duct thereby. In situations where the air temperature exterior of the building is below freezing prior art exchangers have experienced ice formation problems. These problems can occur when the exhaust fan is located adjacent the exterior of the structure wherein water condensed from the cooled exhaust air freezes after the exhaust fan turns off causing the blades thereof to become frozen to the fan housing. In the present invention, the exhaust fan is located in the heated interior of the building, and thus, such damaging ice formation cannot occur.

The circular cross section of exhaust duct provides for the greatest amount of heat exchange surface area for a given length of the exhaust duct. Thus, the present invention efficiently utilizes the volume of space that it occupies. This efficiency is advantageous particularly in residential applications where it can be desirable to minimize the cross diameter thereof.

A primary advantage of the present invention is the achievement of greater heat exchange efficiency in an air to air heat exchanger.

Another advantage of the present invention is its ability to operate efficiently in situations wherein the exhaust air is highly humid.

Another advantage of the present invention concerns it ability to operate in highly corrosive environments.

A further advantage of the present invention concerns its efficient use of space for providing a heat exchanger useful for structures wherein space is at a premium.

BRIEF DESCRIPTION OF THE DRAWINGS

Further objects and advantages of the present invention can be seen in the light of the following detailed description and figures, wherein:

FIG. 2 is an enlarged cross sectional detail view of the present invention, taken at 2—2 of FIG. 3.

FIG. 3 is an end elevation view of the present invention.

DETAILED DESCRIPTION OF THE PREFERRED EMBODIMENT

Figure 1:
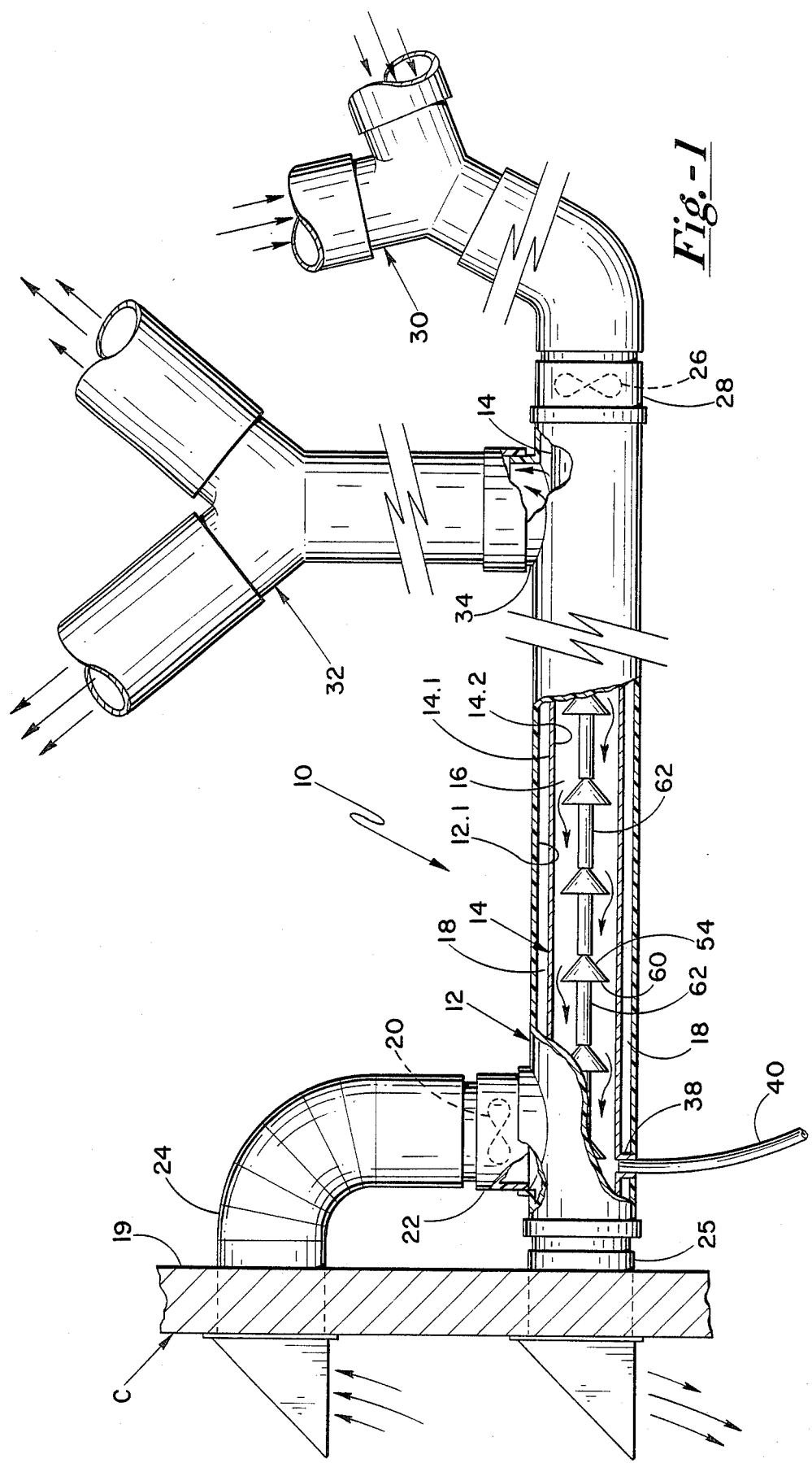
FIG. 1 is an elevation view of the present invention with portions shown in section and broken away for clarity of detail.

The air to air heat exchanger of the present invention is seen in FIG. 1 and generally designated 10. Heat exchanger 10 includes an exterior tubular and cylindrical housing 12 and a tubular cylindrical exhaust duct 14 extending longitudinally within housing 12 and along the central axis thereof. Housing 12 includes an interior perimeter surface 12.1 and exhaust duct 14 defines an exterior heat exchange surface 14.1 and an interior heat exchanger surface 14.2. Also, exhaust duct 14 defines a central exhaust air passage 16. An annular intake air passage 18 extends around exhaust duct 14 in the space between the heat exchange surface 14.1 thereof and interior perimeter housing surface 12.1.

Heat exchanger 10 is mounted within a building C to be ventilated with one end thereof mounted adjacent an exterior wall 19 of the building. An intake fan 20 is mounted within a fan housing 22 and secured to housing 12 by a boss support 23 formed integrally of housing 12 to provide for air communication between the fan 20 and intake air passage 18. Fan housing 22 is also connected to a duct 24 extending through wall 19 for providing a supply of fresh air to intake passage 18 by operation of fan 20. Also, exhaust duct 14 includes an exterior portion 25 that extends through wall 19 for providing exhausting of the exhaust air exterior of the building.

An exhaust fan 26 is mounted within a fan housing 28 secured to the inner end of heat exchanger 10 opposite from intake fan 20. Exhaust fan housing 28 provides for air flow communication between exhaust ducts 30 within the building and exhaust passage 16 within duct 14. The exhaust ducts 30 extend to various parts or rooms of the building to gather spent air to be exhausted.

A fresh air supply duct 32 is in air flow communication with intake air passage 18 by means of support or boss 34 which is formed integrally of housing 12 for supplying fresh air to various locations in the building.

A water drain 38 extends through exhaust duct 14 to the interior exhaust passage 16 thereof and is attached to a hose 40.

As seen in better detail in FIGS. 2 and 3, exhaust duct 14 is held within housing 12 by support rings 44. Support rings 44 can consist of, for example, wood or plastic blocks secured to interior perimeter housing surface 12.1 and to heat exchange surface 14.1 of duct 14. A rod 46 extends longitudinally through exhaust duct 14 along the central axis thereof and is supported therein by a rigid webbing supports or grids 48. Supports 48 consist of three rod-like legs 49 extending radially from the center of support 48 and secured together by an outer ring 50, an extreme outer ring 50.1, and an inner ring or hub 51. The inner ends of legs 49 are welded to inner ring 51 and the outer ends of legs 40 traverse the ends of the exhaust duct 14. Rod 46 extends through the center rings 51 of both grids 48 and is secured thereto by a nut 52.

A plurality of metal turbulator cones 54 extend along and are mounted on rod 46. Each of the cones 54 has an apical or pointed end 56 and increase in cross sectional area towards a base end 58 and terminate in a base perimeter edge 60. Rod 46 extends through a hole in the apical end of each cone 54. Cones 54 are regularly spaced along rod 46 by spacer tubes 62. Tubes 62 serve to maintain the proper separation of cones 54, which are slidably engaged along rod 46. Tubes 62 are made of a heat insulating rigid material such as PVC plastic tubing to provide for heat isolation of rod 46. Alternatively the cones 42 and tubes 62 may be all formed of plastic and integrally molded. In this arrangement, one cone and one tube may be integrally molded together, so that each cone has its own mounting tube which also serves to space the cone from the next adjacent cone.

The turbulator cones 54 may be easily removed for cleaning by loosening the nut 52 at one end of rod 46. The rod may be withdrawn to dismount the grids 48 and to remove the cones and spacer tubes 62.

Figure 4:
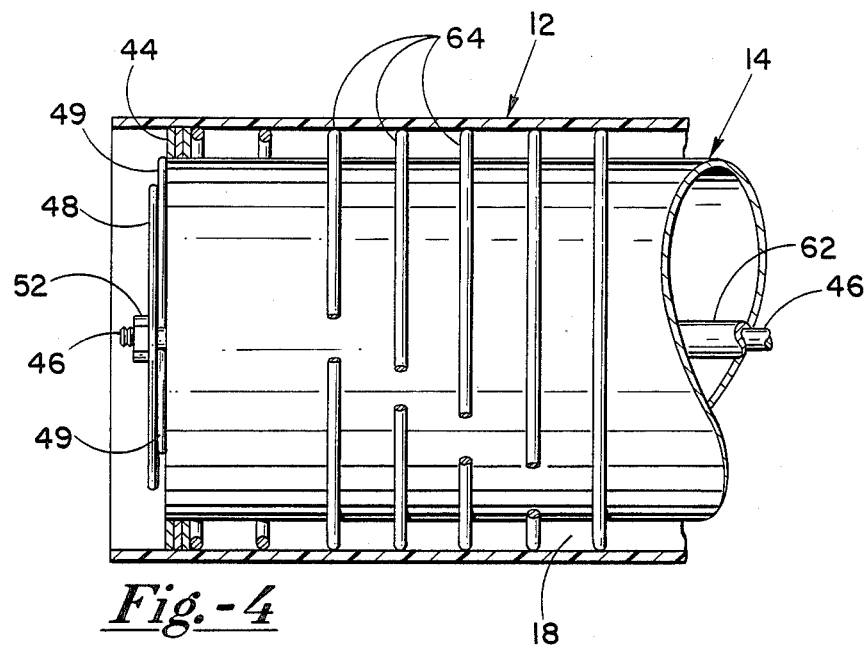
FIG. 4 is a detail section view of a modified form of the invention.
Figure 5:
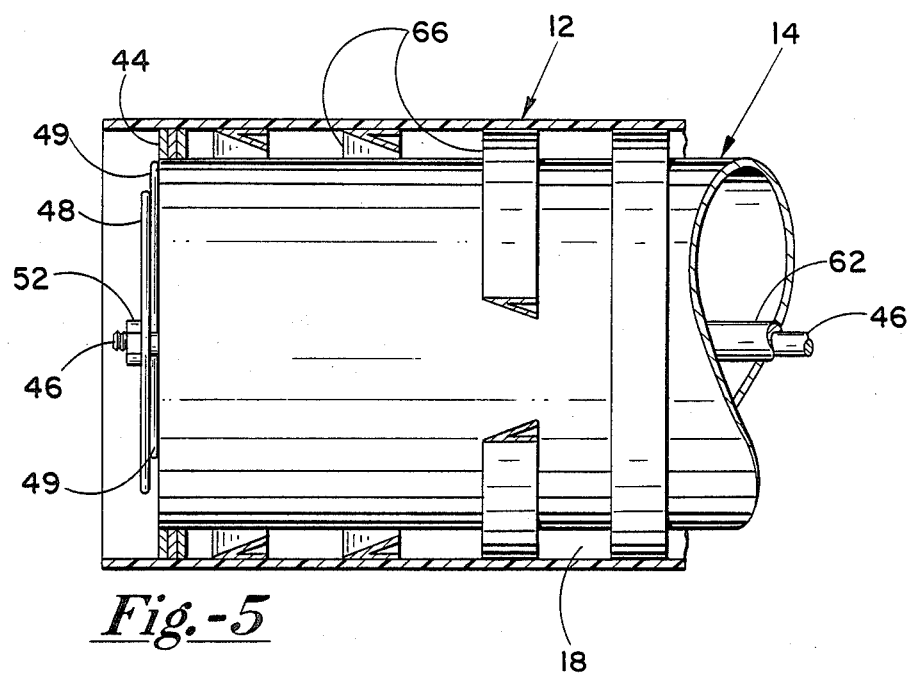
FIG. 5 is a detail section view of a second modified form of the invention.

In a further embodiment of the present invention, as seen in FIG. 4, a plurality of circular wire loops 64 extending around and secured to inner housing surface 12.1 provide for turbulation of the intake air. Also, in another embodiment as seen in FIG. 5, flanges 66 extending around and secured to inner housing surface 12.1 can be used to provide for turbulation of the intake air.

In operation, fan 26 provides for a flow of the fouled exhaust air through exhaust passage 16 by pulling air through duct 30 from the interior of the building and then pushing that air through passage 16 to the exterior of the building in the direction as represented by the arrows in FIGS. 1 and 2. The exhaust air as it flows through passage 16 will be deflected by the exterior surface of cones 54 towards interior perimeter surface 14.2. As the perimeter edges 60 of cones 54 lie adjacent perimeter surface 14.2, the flow of exhaust air therebetween will be restricted and as a result thereof, there will exist a slightly higher pressure at that point of restriction. Consequently, there will be a slightly lower pressure just immediately past the point of restriction in the area between the base of each cone and the apical end of the next succeeding cone. Thus, the exhaust air will be accelerated slightly as it enters this lower pressure area which results in the exhaust air being mixed and accelerated toward the next cone. This mixing allows more of the exhaust air to come into contact with surface 14.2 for the purpose of releasing its heat energy thereto. Therefore, the cooler intake or fresh air traveling through intake passage 18, in the direction as indicated by the arrows in FIGS. 1 and 2, can come in contact with heat exchange surface 14.1 and thereby pick up or recover some of the heat transferred thereto by the exhaust air.

It was determined experimentally that the spacing of cones 54 along rod 46 has a significant effect upon the heat transfer efficiency of the present invention. In particular the distance between the cones represented by distance A in FIG. 2 was preferably equal to ten (10) times the distance between base perimeter edge 60 and interior surface 14.2, distance B, seen in FIG. 3, for purposes of maximizing heat transfer efficiency.

Intake air turbulator ring 64 or flanges 66 serve to provide for turbulation of the intake air by increasing the amount of intake air thereby increasing the amount of intake air that comes into contact with heat exchange surface 14.1. This mixing of the intake air, in a manner analogous to the turbulation of the exhaust air, serves to insure the maximum transfer of heat to the intake air.

Heat exchanger 10 is mounted within the structure at a slight angle of inclination such that the exhaust air is released from the building at a point thereon that is slightly lower than the opposite end of the exhaust duct. This provides for drainage of water through water siphon 38 and hose 40 for removal of any water build up in exhaust duct 14. Water build up in exhaust duct 14 can occur when warm moist exhaust air cools as it travels along exhaust duct 14 thereby resulting in the condensation of water therein.

It is contemplated that the turbulator cones 54 could have a variety of smooth geometrically shaped outer surfaces that increases in cross sectional area from an apical end towards an outer perimeter edge. Thus, for example turbulator cones could be hemispherical in shape.

What is claimed is:
1. An air to air heat exchanger, comprising:
  an elongate tubular outer housing for fresh intake air and having an exterior end and an interior end;
  an elongate tubular exhaust air duct for providing exhaust air flow therethrough having a discharge end and an intake end, and the exhaust duct having a heat-exchanging perimeter surface and extending longitudinally through the outer housing, the intake end of the duct being located adjacent the interior end of the outer housing, and the outer housing and exhaust air duct defining an annular fresh air flow passage therebetween, for providing fresh air flow therethrough,
  means for supporting the exhaust duct within the outer housing and isolating the interior of the duct from the annular flow passage,
  a plurality of elongate annular turbulators spaced from each other along and within the elongate exhaust duct, each of the turbulators having a convergent end and a base end and a smooth geometric exterior surface therebetween, the turbulators increasing in cross sectional area in a direcion from the convergent ends to the base ends thereof, the turbulators being regularly spaced along a longitudinal axis of the exhaust duct and the convergent end of each turbulator facing the base end of the next succeeding turbulator, and the turbulators being positioned within the exhaust duct so that the convergent ends thereof are oriented in a direction to extend toward said intake end of the duct, and
  means for supporting the turbulators within the exhaust chamber, the turbulator support means including a rod, a pair of support grids, and a plurality of tubes, the rod extending centrally through the exhaust duct, turbulators and tubes, the grids traversing the ends of the duct and being secured to the rod, the tubes separating the turbulators and insulating the rod.

2. The air to air heat exchanger as defined in claim 1 wherein the turbulators are cone shaped.

3. The air to air heat exchanger as defined in claim 2 wherein the turbulators extend along the central axis of the exhaust duct.

4. The air to air heat exchanger as defined in claim 1 and further including an exhaust fan secured to and in air flow communication with the intake end of the exhaust duct, and an intake fan secured to the exterior end of the outer housing and in air flow communication with the annular passage flow.

5. The heat exchanger according to claim 2 and a plurality of annular convolutes on the inner periphery of the tubular outer housing and in the annular fresh air flow passage.

6. The air to air heat exchanger as defined in claim 1 wherein the outer housing includes polyvinylchloride tubing.

7. The air to air heat exchanger as defined in claim 1 wherein the exhaust duct, turbulators, and turbulator support means include aluminum.

8. The air to air heat exchanger as defined in claim 1, wherein the exhaust duct, turbulators, and turbulator support means include stainless steel.

9. The air to air heat exchanger as defined in claim 1, wherein the tubes include polyvinylchloride plastic tubes.

10. The air to air heat exchanger as defined in claim 1, wherein the convergent ends of the turbulators are separated by a distance equalling approximately ten times the distance between perimeters of the base ends and the perimeter surface of the exhaust duct.

* * * * *